United States Patent Office 3,315,701
Patented Apr. 25, 1967

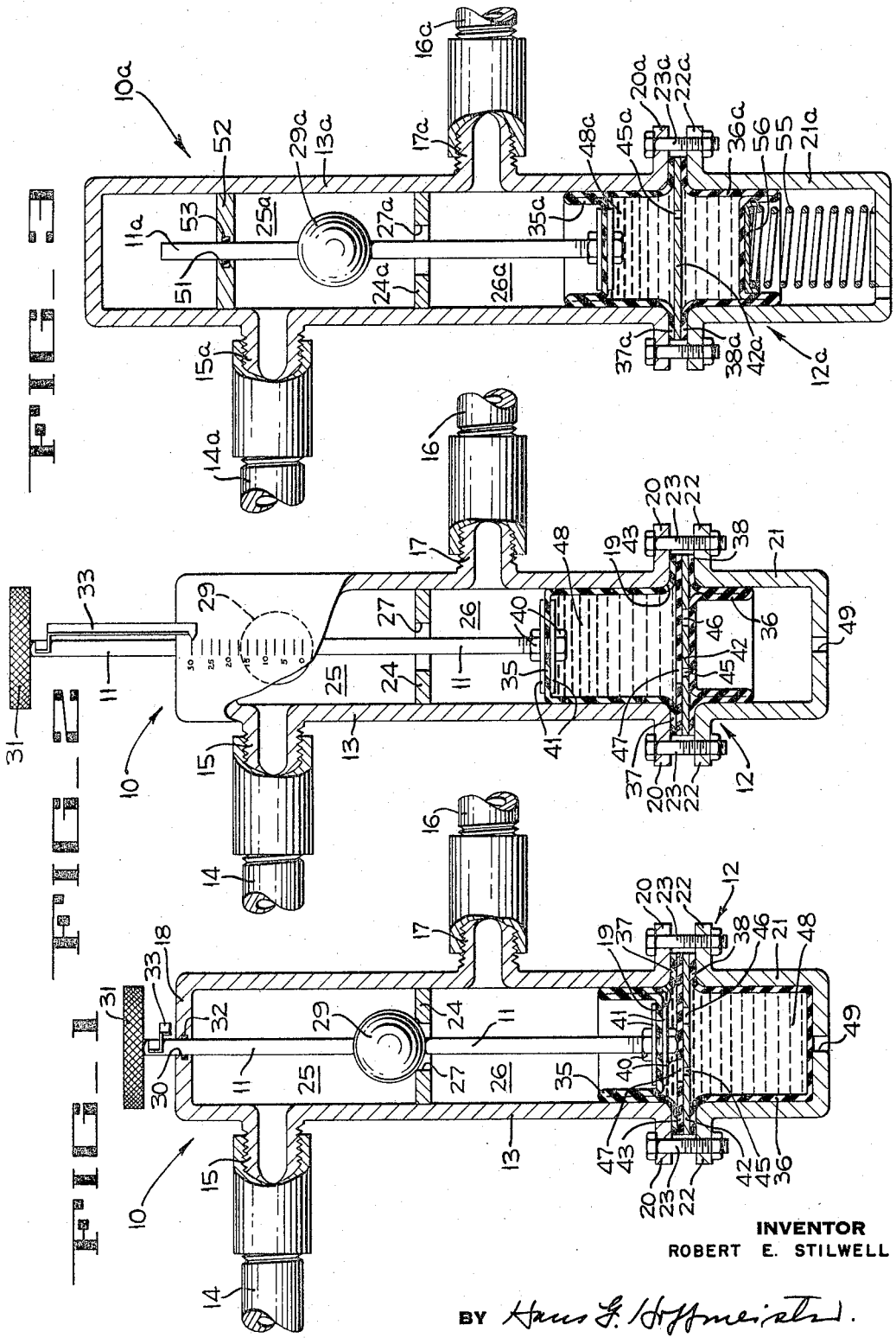

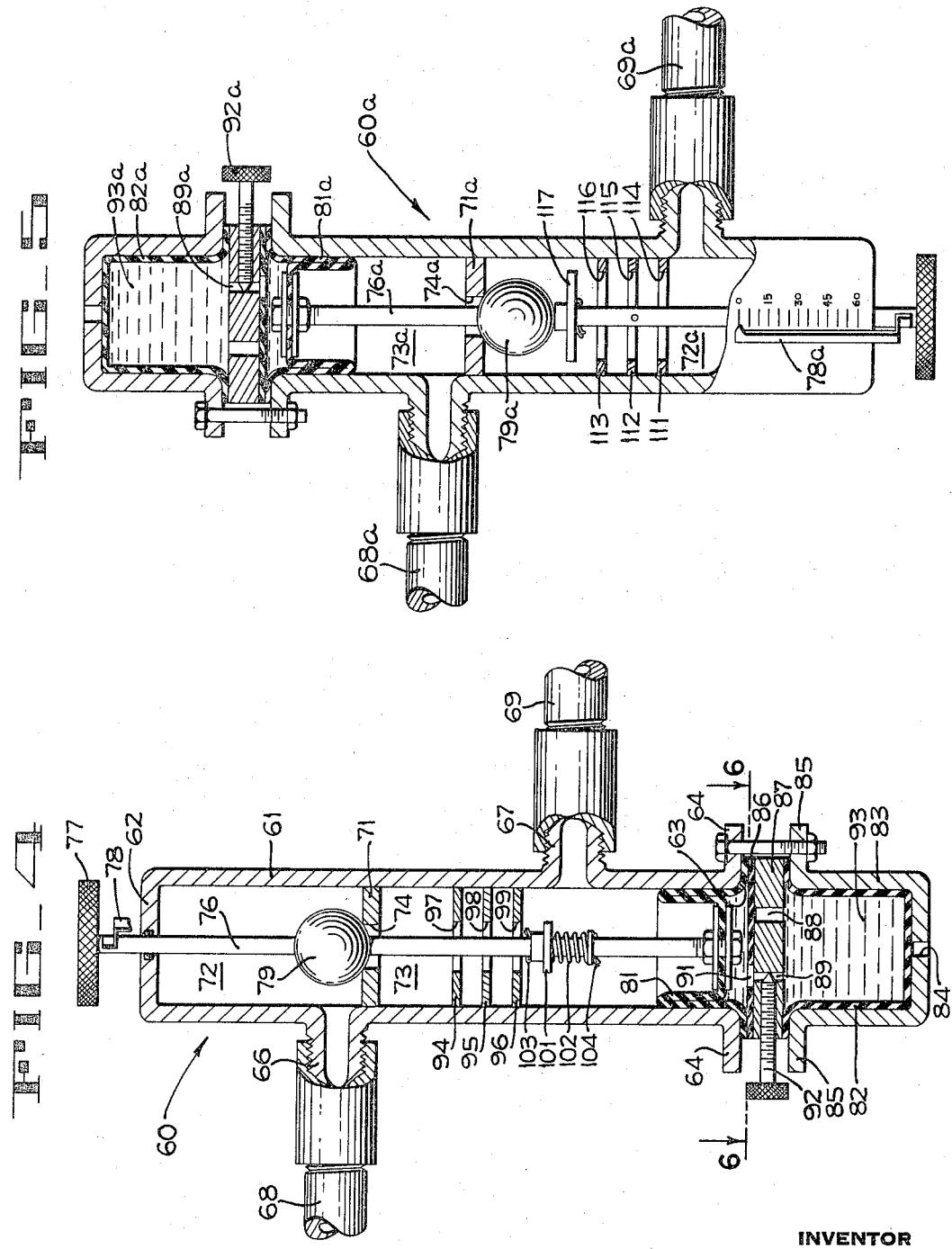

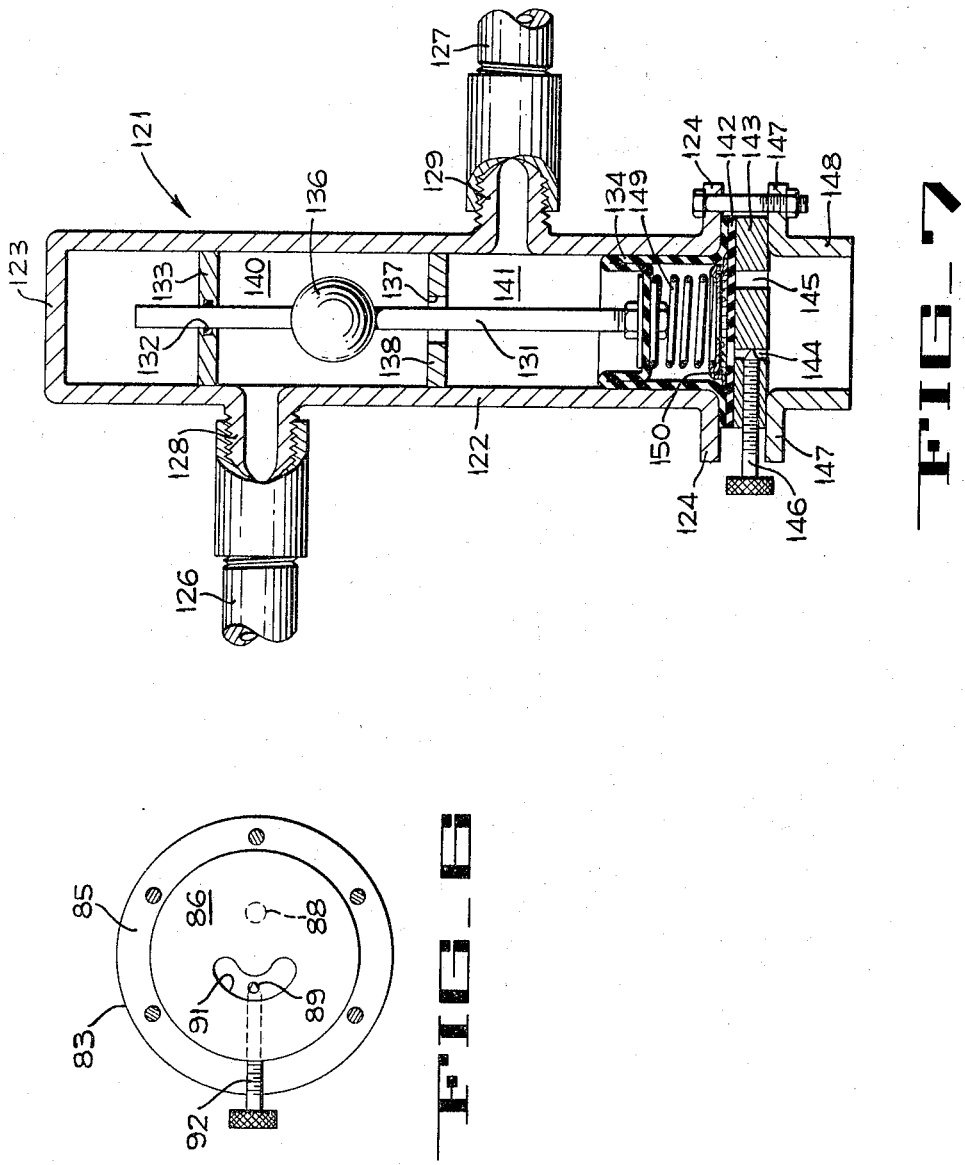

3,315,701
FLOW TIMING DEVICE
Robert E. Stilwell, Santa Clara, Calif., assignor to FMC Corporation, San Jose, Calif., a corporation of Delaware
Filed Aug. 13, 1962, Ser. No. 216,442
5 Claims. (Cl. 137—624.18)

The present invention pertains to flow timing devices and more particularly to devices for determining flow time at a constant fluid pressure and for timing a series of momentary pressure drops in a flow line.

In present day flow systems a continuing problem is presented in the provision for and the operation of the control mechanisms for determining the flow time in the system. In particular, this problem has been present in irrigating or sprinkling systems where it is highly desirable from the standpoint of economy to determine the amount of water to be distributed to various areas and sections of lawn, fields, orchards, and the like, and to time and regulate the flow accordingly. Generally, an electrically operated solenoid valve has been utilized for this purpose, but such a device has many attendant problems. Among these are its relatively high initial cost to the user, the problems of installation and power supply, and the special and costly maintenance required.

It is therefore, an object of the present invention to provide a wholly mechanical timing device for determining flow time through a connected flow line which is simple in operation, requires only a minimum of working parts, and is economical to produce.

Another object of the present invention is to provide a flow timer which will cause momentary pressure drops in a flow line at predetermined intervals of time. Such a timer is of utility, by way of example, in the control and operation of a special type of sequential irrigation system which is disclosed in applicant's pending U.S. patent application Ser. No. 766,912, now Patent No. 3,080,881 issued Mar. 12, 1963. In such a system, flow is transmitted to a plurality of outlets serially arranged along a single flow line. Each of the outlets is controlled by a valve which functions in a manner rendering it responsive to a momentary drop in pressure to shut off flow in its associated outlet and allow flow through the next valve and outlet along the line. The device of the present invention, therefore, causes the timed momentary pressure drops in the line which are required to allow flow through only one outlet at a time in a controlled, sequential manner.

Another object of the present invention is to provide a flow timing device which will automatically stop flow in a flow line after a predetermined time and which will reset itself automatically for another flow cycle.

Another object is to provide a mechanical timing mechanism for controlling a valve in a flow line which, after once being set, will operate automatically with great accuracy, and the service requirements of which are minimized.

Another object is to provide a pressure regulating valve which will operate to cause only momentary pressure drops in a flow line and which may be controlled by a timed movement.

Other objects and advantages of the present invention will become apparent from the following description and the accompanying drawings in which:

FIG. 1 is an axial section through the flow timing device of the present invention during one stage of its operating cycle and showing its connections to a flow line.

FIG. 2. is a partial axial section through the flow timing device of FIG. 1 during a second stage of its operating cycle.

FIG. 3 is an axial section through a second embodiment of the flow timing device showing its connections to a flow line.

FIG. 4 is an axial section through a third embodiment of the flow timing device showing its connections to a flow line.

FIG. 5 is a partial axial section through a fourth embodiment of the flow timing device showing its connections to a flow line.

FIG. 6 is a section taken along the line 6—6 in FIG. 4.

FIG. 7 is an axial section through a fifth embodiment of the flow timing device showing its connections to a flow line.

The invention, several embodiments of which are shown and described herein, comprises generally a valve member 10 (FIG. 1) which is connected into a flow line, an operating rod 11 which opens and closes a passage through the valve member, and hydraulic timing means 12 which times the rate of travel of the operating rod and serves to close the passage through the valve member after a pre-set time. The hydraulic timing means is actuated by the pressure of fluid within the valve member which gradually forces a given amount of enclosed hydraulic fluid through a very small passageway, the amount of such hydraulic fluid determining the time of operation of the flow system.

Referring now more specifically to the drawings, FIGS. 1 and 2 show an embodiment of the present invention wherein the valve member 10 comprises a cylindrical body portion 13 which is connected to an inlet flow line 14 by means of a nipple 15 and is connected to an outlet flow line 16 by means of a nipple 17. The cylindrical body portion includes a closed end 18 and an open end 19 provided with a radial flange 20. Secured to the open end 19 is a tubular end cap 21 which is provided with a flange 22 similar to the flange 20 of the body portion, allowing the body portion and the end cap to be secured together by means of a plurality of bolts 23 which extend through the flanges 20 and 22.

Located approximately midway in the cylindrical body portion 13 is a valve plate 24 which restricts the passage of fluid through the valve member. The valve plate divides the tubular body portion into an upper chamber 25 and a lower chamber 26 and is provided with an opening 27 therethrough for allowing flow through the valve member.

The slender, rigid operating rod 11 which extends longitudinally through the body portion 13 has secured thereto a spherical ball member 29 at about its midpoint. The ball member is adapted to seat upon the opening 27 (as seen in FIG. 1) to block the passage through the valve member and stop flow in the flow line. For this purpose, the ball member is preferably made of a resilient material such as hard rubber so as to form an effective seal with the valve plate 24. One end of the rod extends through an opening 30 in the closed end 18 of the body portion and has a knurled knob 31 at its tip so that the rod may be easily manipulated from an advantageous position. The opening 30 is sealed by means of a sealing ring 32 fixed in the end wall 18 and encircling the opening in sliding, fluid-sealing engagement with the rod 11. Rigidly attached to that portion of the rod which projects out of the body portion of the valve member is an indicator arm 33 adapted to move with the rod to indicate the time setting for the flow through the valve member, as will be later explained.

As is apparent, the valve member 10 is opened to allow flow therethrough when the rod 11 is raised to lift the ball member 29 from its seat upon the plate opening 27 to a position such as shown in FIG. 2. The purpose of the hydraulic timing means 12, then, is to automatically time the return of the rod to the position of FIG. 1 so that the valve member will remain open only for a specified period of time. The timing means includes a pair of tubular, flexible diaphragms 35 and 36 arranged to fit within the chamber 26 and the end cap 21, respectively. These diaphragms are provided with flanged portions 37, 38 which are clamped between the flanges 20 and 22 of the valve member and end cap when the device is assembled to cause the diaphragms to define an enclosed, flexible-walled chamber. The diaphragms are preferably formed of a flexible impervious material such as rubber or a similar substance. The upper diaphragms 35, as seen in FIG. 1, is attached to the end of the operating rod 11 for movement therewith, by means of nuts 40 and flat plates 41 which provide a piston-like connection between the rod and the diaphragm.

Separating the diaphragms 35 and 36 are an orifice plate 42 and a flexible flap member 43 which are both clamped between the flanged portions 37 and 38 of the diaphragms by the bolts 23 through the body portion and end cap flanges 20 and 22. The orifice plate is formed of a rigid material and contains a small restricted passage 45 and a larger passage 46 both of which extend therethrough for communication between the diaphragms. The flexible flap, which is the same geometrical shape as the orifice plate and is made of a readily flexible material such as rubber, overlies the orifice plate and contains one large opening 47 therethrough which is positioned over the smaller passage 45 of the orifice plate. A quantity of a suitable hydraulic fluid 48 is contained within the chamber formed by the flexible diaphragms, the volume of fluid being slightly greater than the total capacity of one of the diaphragms when in its fully extended or inflated position in contact with the cylindrical walls of the body 13 or end cap 21. The end cap is provided with an opening 49 in its end wall which maintains communication between the exterior of the diaphragm 36 and atmosphere.

In operating the timing device 12, the operator first lifts the operating rod 11 by the knob 31 from the position of FIG. 1 to that of FIG. 2 to remove the ball 29 from the valve opening 27 and start the flow of water from the inlet conduit 14 through chambers 25 and 26 and out the outlet conduit 16. When the operating rod is lifted, it extends and inflates the diaphragm 35, creating therein a partial vacuum which draws the fluid 48 from the diaphragm 36. The flexible flap 43 acts as a one-way valve by allowing the fluid to be drawn from diaphragm 36 through the large passage 46 in the orifice plate 42 but preventing its movement therethrough in the reverse direction. Since the exterior of the diaphragm 36 is constantly at atmospheric pressure, the fluid will be drawn rapidly through the passage 46 to fill the upper diaphragm 35.

Once the rod is lifted to remove the ball 29 from the opening 27, water or other liquid in the flow line will flow through the valve member 10, as above stated. The pressure of this liquid, being greater than atmospheric pressure, will act on the diaphragm 35 through the piston-like plates 41 to force the hydraulic fluid therein to return to the diaphragm 36. However, the rate of the fluid is limited by the size of the passage 45 since the passage 46 is blocked by the flexible flap 43. It is in accordance with the invention to make this passage 45 quite small so that a sufficient period of time will elapse before the diaphragm 35 will collapse to the extent necessary for the ball 29 to close the opening 27 and shut off the flow through the valve member.

The particular size of the passage 45 is dependent, of course, upon the normal pressure in the flow line, the size of the cylindrical body portion 13, the nature of the hydraulic fluid used in the diaphragms, and on the amount of flow time desired. To indicate the time for each flow period the exterior of the body portion 13 is provided with a scale which is graduated into increments to indicate time intervals. The indicator arm 33 allows the operating rod 11 to be set for the proper time interval by indicating the time required for the valve to close. As seen in FIG. 2, the present embodiment of the invention is provided with a scale graduated in 2½ minute intervals, and the indicator arm is raised to its full extent to indicate a period of 30 minutes required to cause the flow through the valve member to cease. The various increments and total time interval may be easily determined and set by experimentation and varying of the factors involved in the movement rate of the operating rod outlined above.

A second embodiment of the invention is illustrated in FIG. 3. Parts corresponding to those parts described in relation to the embodiment of FIGS. 1 and 2 will not be redescribed and will be given reference numerals corresponding to the numerals of the like parts in FIGS. 1 and 2 with the addition of the suffix $a$.

The valve member 10$a$ is constructed similarly to the valve member 10 except that the rod 11$a$ does not project from the tubular body portion 13$a$. The rod is contained wholly within the body portion and is guided by means of an opening 51 in a guide plate 52 which fits within the cylindrical walls of the body portion above the inlet 14$a$. An O-ring 53 is provided around the opening 51 and acts as a bearing for the rod.

The timer means 12$a$ has also been modified. The one-way flexible flap valve member has been eliminated, and the orifice plate 42$a$ contains only one passage 45$a$ therethrough. This passage is small, corresponding in size to the opening 45 in the embodiment of FIG. 1. The end cap 21$a$ is axially longer than the corresponding cap in the previous embodiment to accommodate a compression spring 55 which bears against the end wall of the end cap to impose pressure upon the diaphragm 36$a$ through a cup member 56 which receives the driving end of the spring and engages the diaphragm member 36$a$.

The embodiment of FIG. 3 is operated in a manner slightly different from that of FIG. 1. The spring 55 serves to automatically reset the timing device 12$a$ by raising the rod 11$a$ to its uppermost position when flow through the valve member 10$a$ is shut off by exterior means (not shown) and the valve member is opened to atmospheric pressure both upstream and downstream. When this condition is established, the spring forces the fluid 48$a$ from the diaphragm 36$a$ to the diaphragm 35$a$ to inflate the latter. Upon resumption of flow in the system through an external valving means (not shown), the fluid pressure in the chamber 26$a$, which is greater than the pressure exerted by the spring, will force the hydraulic fluid from diaphragm 35$a$ back to diaphragm 36$a$ through the restricted passage 45$a$ until the rod is lowered to a position wherein the ball member 29$a$ seats on the valve plate 24$a$ to seal the passage 27$a$ therethrough. Since the valve member 10$a$ serves to reset itself, the rod does not have to be manipulated by hand and is, as previously mentioned, wholly contained within the body portion 13$a$. However, the system must be periodically opened to atmospheric pressure both at the inlet 14$a$ and outlet 16$a$, as previously pointed out, in order to allow the resetting to occur.

A third embodiment of the invention is illustrated in FIG. 4. The valve member 60 of this embodiment possesses an additional function, being designed to cause a series of momentary pressure drops in the flow line at predetermined time intervals before finally stopping the flow entirely. One of the purposes of this method of operation is to control a plurality of series-connected valves which are sequentially caused to operate in response to such momentary pressure drops, such a sequential valve system being disclosed in applicant's above mentioned pending U.S. patent application Ser. No. 766,-912.

The valve member 60 is comprised of a cylindrical body portion 61 having a closed upper end 62 and an open lower end 63 provided with a radial flange 64. The body portion is also provided with nipples 66 and 67 which receive inlet conduit 68 and outlet conduit 69, respectively. Positioned just beneath the inlet conduit is a valve plate 71 which extends across the cylindrical body portion, dividing it into an upper chamber 72 and lower chamber 73. An opening 74 is provided in the central portion of the valve plate to define a passageway between the upper and lower chambers.

Extending centrally through the valve member is an operating rod 76 which projects exteriorly of the closed end 62 where it is provided with a knob 77 and an indicating arm 78 similar to that previously described in connection with the embodiment of FIG. 1. Fixed at a position along the axis of the rod is a resilient ball member 79 which is adapted to seat upon the opening 74 to seal off flow through the valve member.

The timing mechanism in the embodiment of FIG. 4 comprises a pair of tubular diaphragms 81 and 82 which are generally cylindrical in shape and are received within the chamber 73 and an end cap 83, respectively. The end cap is provided with an opening 84 to vent its interior to atmospheric pressure, and its upper end is formed with a radial flange 85 which is similar to and is bolted to the flange 64 of the body portion 61. Positioned between the diaphragms are a flexible flap member 86 and a rigid disc 87. Both of the diaphragms, the disc, and the flexible flap member are clamped tightly between the flanges 64 and 85 upon assembly of the valve member. The disc is provided with large passage 88 and a smaller passageway 89 extending therethrough while the flexible flap has one crescent shaped aperture 91 therein which overlies the passageway 89 in the assembled position, as best seen in FIG. 6. Extending through the side of the disc and into the passageway 89 is a threaded needle valve 92 which is adapted to regulate the effective size of the passageway, such regulation being obtained by turning the needle valve inward to restrict the pasage, or outward to increase the flow rate through the passage. A quantity of a suitable hydraulic fluid 93 is contained within the chamber created by the two diaphragms, and the upper diaphragm 81 is fastened to the lower end of the rod 76 to move therewith.

As thus far described, the valve member 60 is similar in structure and operation to the valve member 10 of FIGS. 1 and 2. The operating rod 76 is raised to quickly draw the hydraulic fluid 93 from the lower diaphragm 82 into the upper diaphragm 81 through the larger passage 88 to inflate the latter diaphragm. Once the rod is released, the pressure upon the upper diaphragm from the flow through the valve member gradually forces the fluid 93 through the restricted passageway 89 and back into the lower diaphragm until the ball member 79 is seated upon opening 74 to stop the flow. The time required for this last mentioned function can be regulated by means of the needle valve 92.

In addition to the basic flow timing function outlined above, valve member 60 is also designed to cause a series of spaced momentary pressure drops in the outlet conduit 69 or downstream side of the valve member before cutting off the flow entirely. For this purpose a series of circular baffles 94, 95 and 96 are fixed within the lower chamber 73, each baffle being provided with a central circular opening 97, 98, 99, respectively, through all of which the control rod 76 extends. The rod is provided with a flexible element comprising a slidable circular plate 101 and a spring 102, both of which are restricted in their sliding movement on the rod by means of cotter pins 103 and 104. The spring, which bears on lower cotter pin 104, is of such a character that it normally holds the plate against upper cotter pin 103. The circular plate is of a slightly smaller diameter than the circular openings in the baffles.

At the start of the flow cycle, the rod 76 is lifted, as previously explained, to raise the ball member 79 from the opening 74 and also to raise the circular plate 101 above the uppermost baffle 94. As the fluid pressure within chamber 73, acting upon diaphragm 81 gradually lowers the rod, the circular plate is caused to come into planar alignment with the upper baffle 94. Due to the relatively small clearance between the plate and the baffle, flow is restricted and the pressure downstream is reduced. This condition is only temporary, however, for as the pressure on the circular plate builds up, the plate is forced down on the rod against the urging of the spring. Thus, the plate passes through the opening 97, and the pressure becomes balanced once more on both sides of the baffle 94. This operation is repeated as the circular plate comes successively into planar alignment with baffles 95 and 96 during the subsequent descent of the operating rod. Thus it can be seen that there will be three intermittent momentary drops in pressure once the flow cycle is started and before the ball member 79 becomes seated upon the opening 74 again to stop the flow through the valve member.

A fourth embodiment 60a of the invention, illustrated in FIG. 5, is similar to the embodiment of FIG. 4 except that the position of the inlet and outlet lines is reversed along with the position of the ball member in respect to its seat, and the flexible member for causing the momentary pressure drops has been modified. Parts corresponding to parts described in relation to the embodiment of FIG. 4 will not be re-described and will be given reference numerals similar to those used in reference to FIG. 4 with the addition of a suffix a.

Flow enters the valve member 60a through an inlet conduit 68a from where it flows through an upper chamber 73a, through an opening 74a in a valve plate 71a and into a lower chamber 72a, and leaves the valve member through an outlet conduit 69a. The timing mechanism is similar to that of FIG. 4 since it includes a pair of flexible inflatable diaphragms 81a and 82a defining a closed, flexible walled chamber therebetween which contains a measured quantity of a suitable hydraulic fluid 93a. A rod 76a is connected to the closed end of the diaphragm 81a to draw the hydraulic fluid thereinto. The fluid pressure within the chamber 73a will gradually force the hydraulic fluid back into diaphragm 82a through the restricted passageway 89a whose size may be regulated by a needle valve 92a. The amount of time for the period of flow for any of several optional settings of the rod 76a is indicated by graduations on the exterior of the valve member, the embodiment shown being graduated in five minute increments with a maximum flow time of 60 minutes, which is indicated to the operator of the device by means of an indicator arm 78a attached to the rod.

By reversing the positions of the inlet and outlet conduits, valve member 60a causes the incoming flow to bear directly against the diaphragm 81 and continue to do so even after a ball member 79a, which is positioned upon the rod 76a, has sealed the valve opening 74a. In order to cause a series of momentary pressure drops in the downstream flow conduit 69a, a series of baffles 111, 112, and 113 are fixed within the lower chamber 72a and are provided with central circular openings 114, 115, and 116, respectively. Fixed on the rod and held against the ball member is a flat disc 117 of a flexible material such as hard rubber. The diameter of the disc is greater than that of the ball member 79a, and just slightly less than the diameter of each of the circular openings in the baffles. When the rod 76a is fully extended to allow flow within the valve member, the disc will be positioned beneath the lowermost baffle 111. As the rod is drawn upwardly by the pressure of the inflow against the flexible diaphragm 81a, the disc will eventually be brought into alignment with the baffle 111 to thus restrict the flow through the central opening thereof and cause a pressure drop in the downstream conduit 69a. This drop will only be momentary, however, since the pressure of the water above the flexible disc will soon cause the disc to bend sufficiently to allow flow through the baffle to equalize the downstream and upstream fluid pressures. The above operation is repeated as the disc passes each of the baffles 112 and 113. Thus three momentary pressure drops occur in the outlet conduit 69a as the rod 76a moves from its starting position to its finishing position seen in FIG. 5.

If desired, the direction of flow could be reversed within the valve member 60a, i.e., the conduit 69a could be used as an inlet conduit and the conduit 68a as an outlet conduit. Since the flexible disc 117 may bend in either direction to permit the flow to pass around it, a reversal of the flow direction will not impede its operation and the series of momentary pressure drops will occur during the flow cycle in the same manner as above described.

A fifth embodiment 121 of the invention, illustrated in FIG. 7, is adapted to use air as the fluid to time the descent of the operating rod. This embodiment is also automatically resettable in the manner of the embodiment 10a of FIG. 3.

The structure of the valve member 121, seen in FIG. 7, comprises a cylindrical body portion 122 which is closed at its upper end 123 and is provided with a radial flange 124 at its lower open end. The valve member is fixed to an inlet conduit 126 and an outlet conduit 127 by means of threaded nipples 128 and 129, respectively. Disposed coaxially within the body portion 122 in an operating rod 131 which is slidable within a sealed opening 132 in a plate 133 near the upper end of the body portion. The rod is connected to a flexible tubular diaphragm 134 at the lower end of the body portion. A slightly resilient ball member 136 is fixed to the rod at a position near its midpoint and is movable with the rod to provide a closure for a passage 137 through a valve plate 138. It can be seen that plates 133 and 138, therefore, divide the cylindrical body portion into chambers 140 and 141.

The diaphragm 134 overlies a flexible flap valve member 142 and a disc 143 having a restricted passageway 144 and a larger passage 145 therethrough, the flap member and the disc being structurally and operatively similar to those illustrated and described in connection with the embodiments 60, 60a of FIGS. 4 and 5. A regulating needle valve 146 is also provided in the disc, such valve being designed to operate in the manner of the needle valves 92, 92a of FIGS. 4 and 5. The diaphragm, flexible flap, and disc are clamped between the flange 124 and a flange 147 on a tube 148 which is open to atmospheric pressure. Located wholly within the diaphragm 134 is a spring 149 which bears against the diaphragm's upper inner surface and is positioned upon a ring-like bearing member 150 extending around the inner periphery of the diaphragm.

The spring 149 serves to reset the valve member 121 when the pressure is reduced in inlet and outlet conduits 126 and 127. It is apparent that such resetting could be accomplished without the flexible flap or one-way valve member 142 and the large passage 145 in disc 143; however, it would require a considerable longer period of time. Once the valve member is reset and flow started in the system, the fluid pressure on the diaphragm 134 will force the air trapped within it through the restricted passageway 144 and against the action of the spring until the ball member 136 is seated upon the passage 137 to stop the flow therethrough. Since air is the hydraulic fluid, it can be appreciated that the passageway 144 must be quite restricted in order to allow a reasonable time for the timing device to operate, and, therefore, the needle valve 146 must be adjusted so as to substantially block all but a very small portion of the passage.

From the foregoing description, it is apparent that the structure of the present invention provides a wholly mechanical timing device for a flow system which can be set for various selected flow times in a simple manner and which will operate to automatically stop the flow in the system after the selected time interval. The timing device may permit flow at a constant pressure throughout the selected time interval, or it may be provided with additional means to cause a series of spaced pressure drops in the line. The timing device is completely mechanical in nature and requires only a minimum of parts to achieve these functions, and is economical to manufacture.

While several embodiments of the present invention have been shown and described, it will be understood that various changes and modifications may be made therein without departing from the spirit of the invention or the scope of the appended claims.

The invention having thus been described, what is believed to be new and desired to be protected by Letters Patent is:

1. A flow timing device comprising a valve member having a flow passage therethrough with spaced inlet and outlet ports, a valve plate having an opening therein positioned in said passage between said spaced ports, a control rod movable longitudinally within said valve member and extending through said opening, closure means carried by said rod and adapted to be moved by said rod between a first position in spaced relation to the opening and a second position closing the opening to halt flow through the valve member, a flexible element attached to said rod and adapted to be moved therewith, said element being capable of yielding relative to said rod under excessive fluid pressure, a baffle positioned in said passage to cooperate with said flexible element in momentarily blocking flow through the passage and temporarily reducing the outflow pressure when said element is moved into alignment therewith and until the increased upstream fluid pressure causes said flexible element to yield and unblock said passage, and timing means connected to said rod for controlling the movement thereof.

2. A flow timing device comprising a tubular valve member having a flow passage therethrough with spaced inlet and outlet ports, a valve plate having an opening therein positioned in said passage between said spaced ports, a control rod movable longitudinally within said valve member and extending through said opening, closure means affixed to said rod and adapted to be moved by said rod between a first position in spaced relation to the opening and a second position closing the opening to terminate flow through the valve member, a flexible element mounted upon said rod, a baffle positioned in said passage between said ports and having an opening therethrough of a peripheral shape substantially the same as that of said flexible element with a cross sectional area slightly greater than that of said flexible element so as to cause at least a partial blocking of the flow through said valve member with a reduction in the outflow pressure when said flexible element is moved into alignment with the baffle, said flexible element being movable relative to said rod when subjected to increased pressure due to said blocking to provide for the resumption of normal flow through the passage, and timing means connected to and controlling the movement of said rod.

3. A flow timing device as set forth in claim 1 wherein said flexible element comprises a flow blocking member slidably mounted upon said control rod and spring means yieldably biasing said flow blocking member in the direction of said flow passage inlet port.

4. A flow timing device as set forth in claim 1 wherein said flexible element comprises a flat member mounted upon said control rod, said flat member being of a yieldable and resilient material which will allow the upstream fluid pressure to distort said member sufficiently to permit the resumption of normal flow through said flow passage.

5. In a flow timing device the combination comprising a valve member having a flow passage therethrough with spaced inlet and outlet ports, valve means movable into an open position and a closed position to open and close said passage, respectively, to flow between said ports, means for moving said valve means between said open and closed positions, a series of spaced elements associated with said valve member, a flexible member connected to said valve means and being capable of yielding relative to said valve means under excessive fluid pressure, said flexible member cooperating successively with each of said spaced elements for momentarily blocking flow through said passage until a pressure differential of sufficient magnitude has been created across said flexible member so as to cause said member to yield to the upstream fluid pressure to create a series of spaced momentary pressure drops in the fluid leaving said flow passage during the period of movement of said valve means.

References Cited by the Examiner

UNITED STATES PATENTS

| | | | |
|---|---|---|---|
| 362,277 | 5/1887 | Homan | 137—495 |
| 2,343,347 | 3/1944 | Turner | 188—98 |
| 2,455,240 | 11/1948 | Dupler | 137—556.3 XR |
| 2,456,493 | 12/1948 | Drane | 137—556.3 XR |
| 2,469,038 | 5/1949 | Winkler | 251—54 XR |
| 2,528,822 | 11/1950 | Dunn | 251—54 |
| 2,557,287 | 1/1951 | Hormann | 251—54 |
| 2,579,334 | 12/1951 | Plank | 251—54 |
| 2,580,433 | 1/1952 | Kain | 251—54 |
| 2,791,298 | 5/1957 | White | 188—98 |
| 2,928,644 | 3/1960 | Heinicke | 251—54 |
| 2,984,253 | 5/1961 | Stout | 251—54 |

ALAN COHAN, *Primary Examiner.*

WILLIAM F. O'DEA, ISADOR WEIL, MARTIN SCHWADRON, R. H. MASSENGILL,
*Assistant Examiners.*